No. 738,702.

Patented September 8, 1903.

UNITED STATES PATENT OFFICE.

JOHN GEORGE SCHEINERT, OF CHICAGO, ILLINOIS, ASSIGNOR OF ONE-HALF TO CHARLES E. CALM, OF CHICAGO, ILLINOIS.

LARD COMPOUND.

SPECIFICATION forming part of Letters Patent No. 738,702, dated September 8, 1903.

Application filed February 12, 1903. Serial No. 143,000. (No specimens.)

*To all whom it may concern:*

Be it known that I, JOHN GEORGE SCHEINERT, a citizen of the United States, residing at Chicago, in the county of Cook and State of Illinois, have invented a new and useful Composition of Matter to be Used in the Manufacture of Lard Compound, of which the following is a specification.

Lard compounds made from beef stearine, lard stearine, tallow, cotton-seed oil, and paraffin for use as a shortening and as a substitute for lard as now made are open to the objection of not having the hardness or firmness of good refined lard and of becoming soft, oily, and rancid in the summer months, thereby detracting from their value both as a commercial article and for use.

The object of my invention is to make a lard compound which will be hard and will so remain under summer-weather temperature without becoming soft, oily, and rancid and which will be more palatable, wholesome, and cheaper, and this purpose I accomplish by adding to ordinary lard compounds as a hardening ingredient Chinese wax, also known as "Pela wax," or Japanese wax, using either of these waxes alone or both of them combined added to lard compounds as heretofore made in varying proportions or quantity, according as to whether the lard compound is to be put up or made for summer or winter use.

Chinese or Pela wax is a product of an insect, (*Coccus Ceriferus*,) which product is deposited on the branch of a tree, (*Fraxinus Chinesis*.) This wax is of a white color, odorless and tasteless, and is absolutely harmless to health, containing principally when analyzed chemically ceryl cerotate—

$$(C_{26}H_{53}C_{26}H_{51}O_2.)$$

The point at which this wax hardens varies from between 81° to 83° centigrade or 177° to 181° Fahrenheit, making the wax non-affected by summer heat. Japanese wax is a product of a berry, (*Rhus Succedanea*,) and this product is also of a white color, and the point at which it will melt varies from between 50° to 56° centigrade or 122° to 130° Fahrenheit, which melting-point is above that of the heat of ordinary summer weather. Either of these waxes or a combination of the two when employed as an ingredient in the making of a lard compound produces a compound which on heating will withstand a temperature of at least 600° Fahrenheit without burning or giving off any disagreeable odors, and burning and giving off disagreeable odors has been a serious defect in lard compounds when subjected to a high temperature or when used for culinary purposes.

Lard compounds having therein as an ingredient thereof either Chinese wax or Japanese wax or a combination of the two waxes requires less percentage of stearine to be used as compared with the amount of stearine at present employed in the manufacture of lard compounds, reducing the amount of stearine, in addition to the production of a lard compound having a higher degree of resistance as regards the withstanding of heat, and preventing burning and giving off disagreeable odors, making a better, cheaper, and more desirable product, and one which will be harder, keep better even in cold weather, and which will not in keeping become soft, oily, or rancid in warm weather, particularly in hot or summer weather, rendering the product more suitable as a substitute for leaf-lard for shortening and other use.

The amount or quantity of wax employed can be varied to suit the requirements for use as a winter or summer lard compound or otherwise. A composition for a production of a lard compound suitable for winter use can be made from the following ingredients in substantially the proportion named—that is to say, Chinese wax, eight parts; Japanese wax, two parts; lard stearine or beef stearine, four parts; tallow, two parts; cotton-seed oil, eighty-four parts, and these ingredients when brought together will result in the production of a lard compound suitable for winter-time. A composition for the production of a lard compound suitable for summer use can be made from the following ingredients, combined in substantially the proportions named—that is to say, Chinese wax, ten parts; Japanese wax, two parts; lard stearine or beef stearine, four parts; tallow, two parts; cotton-seed oil, eighty-two parts, a greater proportion of Chinese wax and a less proportion of cotton-seed oil being used for a summer-lard compound than for a winter-lard compound, as in summer greater hardening quality is required, and the proportions stated will result in the production of a lard compound suitable for use in summer-time.

The ingredients, either in the proportions named or otherwise for a winter-lard compound or in the proportions named or otherwise for a summer-lard compound, are placed in a kettle, preferably steam-jacketed, and heated together and bleached with fullers' earth or any other bleaching agent and then filtered and passed into an agitator or into a receptacle containing beaters and the entire mass beaten until it is cooled, after which it is to be run into suitable receptacles ready for the market.

I am not aware that Chinese wax or Pela wax alone or Japanese wax alone or a compound of both of these waxes have ever before been used in making lard compounds. The use of these waxes results in the production of a lard compound which is made hard and capable of use either in winter-time or in summer-time by varying the amount of wax employed in connection with the amount of cotton-seed oil employed, and the lard compound containing either Chinese wax or Japanese wax, or both, will be found specially suitable for export to tropical climates, as it will not become rancid by reason of melting or liquefying.

What I regard as new, and desire to secure by Letters Patent, is—

1. A lard compound consisting of Chinese wax, Japanese wax, stearine, tallow and cotton-seed oil, substantially as specified.

2. A lard compound consisting of fat solids and an oil and having therein as an ingredient Chinese wax for hardening and increasing the melting-point, substantially as set forth.

3. A lard compound consisting of fat solids and an oil and having therein as ingredients Chinese wax and Japanese wax for increasing the solidifying point, substantially as set forth.

JOHN GEORGE SCHEINERT.

Witnesses:
 W. WILLMAN,
 H. ROSENBERG.